United States Patent
Rowley et al.

(10) Patent No.: US 8,713,471 B1
(45) Date of Patent: Apr. 29, 2014

(54) METHOD AND SYSTEM FOR PROVIDING AN INTELLIGENT VISUAL SCROLLBAR POSITION INDICATOR

(75) Inventors: Daniel S. Rowley, Phoenix, AZ (US); Leigh Chapman, Victoria (CA)

(73) Assignee: Intuit Inc., Mountain View, CA (US)

( * ) Notice: Subject to any disclaimer, the term of this patent is extended or adjusted under 35 U.S.C. 154(b) by 247 days.

(21) Appl. No.: 13/006,767

(22) Filed: Jan. 14, 2011

(51) Int. Cl.
*G06F 3/0485* (2013.01)
*G06F 3/0481* (2013.01)

(52) U.S. Cl.
CPC .......... *G06F 3/0485* (2013.01); *G06F 3/04855* (2013.01); *G06F 3/0481* (2013.01)
USPC ........... 715/786; 715/784; 715/785; 715/787; 715/859; 715/861

(58) Field of Classification Search
CPC .................................................... G06F 3/0485
USPC .................. 715/784–787, 859, 861
See application file for complete search history.

(56) References Cited

U.S. PATENT DOCUMENTS

| | | | |
|---|---|---|---|
| 5,515,497 A | 5/1996 | Itri et al. | |
| 2002/0049615 A1 | 4/2002 | Huber | |
| 2004/0113952 A1* | 6/2004 | Randall | 345/830 |
| 2004/0140984 A1* | 7/2004 | Hinckley et al. | 345/684 |
| 2007/0150830 A1* | 6/2007 | Ording et al. | 715/784 |
| 2008/0122796 A1 | 5/2008 | Jobs et al. | |
| 2008/0180408 A1* | 7/2008 | Forstall et al. | 345/177 |
| 2010/0017872 A1 | 1/2010 | Goertz et al. | |
| 2010/0106615 A1 | 4/2010 | Chadwick et al. | |
| 2011/0010656 A1 | 1/2011 | Mokotov | |

OTHER PUBLICATIONS

Bayersdorfer et al., "Method and System for Providing a Visual Scrollbar Position Indicator," U.S. Appl. No. 12/906,787, filed Oct. 18, 2010.

* cited by examiner

*Primary Examiner* — Amy Ng
*Assistant Examiner* — Claudia Dragoescu
(74) *Attorney, Agent, or Firm* — Hawley Troxell Ennis & Hawley LLP; Philip McKay (57) ABSTRACT

A system and method for providing an intelligent visual data scrollbar position indicator whereby data is organized into a data table of two or more data entries with each data entry having one or more data fields. The data table is displayed to a user in a data table user interface display and a scrolling capability is provided whereby a user can scroll through the data entries in the data table via the data table user interface display and one or more user interface devices. At least one data field of the one or more data fields associated with the two or more data entries is selected as a "data display field" and a portion of the data in the selected data display field is selected as "display data" based, at least in part, on the data display field selected and the rate of change of the data in the selected data display field. Then as the data entries are being scrolled through, the selected display data for each data entry is displayed to the user as each data entry is scrolled through.

7 Claims, 3 Drawing Sheets

| | | | | | testy | | | | | |
|---|---|---|---|---|---|---|---|---|---|---|
| ▼ TOOLS | Credit Card 2 -$4,739.67 ⓘ Today's Balance ▼ | | | | | | | FIA Card Services ◯ ▼ Search All | | |
| ⊙ Overview | All Dates ▼ | Any Type ▼ | Any Status ▼ | | Reset Filters | | | 501 items (-$4,739.67) | | |
| ⧠ Transactions | | | | | | | | | | |
| ⧉ Scheduled Transactions | • Date | Payee | Category | Tags | Charge | Payment | Balance | Memo/Notes | | |
| ⧉ Last Download | • 7/8/07 | Fry's Electronics | Entertainment | | -30.30 | | | | | |
| ⚲ Category Explorer | • 4/14/07 | Frys | Groceries | | -17.99 | | | | 309 | |
| ⧮ Accounts Summary | • 5/11/07 | FTD.COM DOWNERS GROVEIL | Gifts | | -56.98 | | | | | |
| | • 2/11/07 | GOOGLE VIDEO*GV GOOG... | Entertainment | | -0.99 | | | | | |
| ▼ Accounts | • 5/28/07 | GREAT AMERICA WEB SAN... | Entertainment | | -55.98 | | 301 | | | |
| ⧠ Credit Card | • 10/9/06 | GRWNG FMLY FIRST FOTO... | My Kids | | -48.66 | | | | | |
| ⧠ Credit Card 2 | • 12/11/06 | GWC*GARRET WADE CO... | Gifts | | -21.70 | | | | | |
| | • 11/11/06 | Gymboree | My Kids | | .01 | | | | | |
| ▼ REPORTS | • 7/1/07 | Hilton | Vacation/Travel | | .40 | | | | | |
| ⧉ Spending Cloud | • 6/25/04 | HOBEE'S CALIFORNIA SAN... | Dining | | .00 | | | 000377008 40823... | | |
| ⧉ Category Summary | • 6/25/07 | HOBEE'S CALIFORNIA SAN... | Dining | | .00 | | | 000377008 40823... | | |
| ⧉ This Month | • 5/29/07 | HOMESTEAD AUTO WASH... | | | .34 | | | | 304 | |
| ⧉ Last Month | • 5/29/07 | HOMESTEAD AUTO WASH... | | | .86 | | | | | |
| ⧉ Spending Over Time | • 7/13/07 | HOMESTEAD AUTO WASH... | | 307 | .36 | | | | | |
| ⧉ Tax Schedule | • 6/17/04 | HOTEL NIKKO SAN FRANCIS | Vacation/Travel | | -6.51 | | | 00418581 41539... | | |
| | • 6/17/04 | HOTEL NIKKO SAN FRANCIS | Vacation/Travel | | -171.19 | | | 00418581 41539... | | |
| | • 6/17/07 | HOTEL NIKKO SAN FRANCIS | Vacation/Travel | | -6.51 | | | 00418581 41539... | | |
| | • 6/17/07 | HOTEL NIKKO SAN FRANCIS | Vacation/Travel | | -171.19 | | | 00418581 41539... | | |
| | • 5/30/04 | Hotels.com | Vacation/Travel | | -677.28 | | | 45370033 1800 9... | | |
| | • 6/7/04 | Hotels.com | Transfer | | | 677.28 | | 45370033 1800 9... | | |
| | • 6/7/04 | Hotels.com | Vacation/Travel | | -1,021.44 | | | 45614485 1800 9... | | |
| | • 5/30/07 | Hotels.com | Vacation/Travel | | -677.28 | | | 45370033 1800 9... | | |
| | • 6/7/07 | Hotels.com | Transfer | | | 677.28 | | 45370033 1800 9... | | |
| | • 6/7/07 | Hotels.com | Vacation/Travel | | -1,021.44 | | | 45614485 1800 9... | | |
| | • 11/17/06 | Insurance | Insurance | | 0.00 | | | | | |
| | • 3/16/07 | Insurance | Insurance | | 0.00 | | | | 303 | |
| | • 3/16/07 | Insurance | Insurance | | 0.00 | | | | | |
| | New Edit Split Schedule Paid Delete | | | | | | | Status Live Community Settings Update | | |

METHOD AND SYSTEM FOR PROVIDING AN INTELLIGENT VISUAL SCROLLBAR POSITION INDICATOR

BACKGROUND

One common way data management systems organize, process, and present electronic data is to organize the data as a list of entries that include one or more data fields associated with each data entry in a "data table" or "data register". For instance, a data management system, such as an online, or computing system implemented, payroll system may organize employee pay records as lists of data entries with each data entry being a line or row in a data table that includes multiple data entry fields such as name, pay rate, address, date, etc. As another example, an online, or computing system implemented, financial management system may organize payees, or payments, as lists of data entries with each data entry being a line or row in a data table that includes multiple data entry fields such as payee name, payment date, item purchased, amount purchased, check number, etc.

Using currently available data management systems, when a user desires to interact with a given data entry, the user is typically presented the data table through user interface display of a display device. Typically, this user interface display includes a scrollbar, or other similar mechanism, through which the user can scroll/move through the data table to find a desired data entry.

Using currently available systems, the user activates the scrollbar, or other similar mechanism, using a user interface device by dragging, or otherwise activating a scroll bar "thumb." Using some currently available systems, the scrollbar, or other similar mechanism, shows the user a visual marker of the relative position of the scroll with respect to the entire data table via a traditional scroll position symbol. For instance, a currently available scrollbar, or other similar mechanism, may use a traditional scroll position symbol to show the user that the position of the scroll is some fraction, say ½, of the way down the data table. However, using currently available systems with traditional scroll position symbols, in order to find out exactly where in the data table the scroll currently is, the user must stop the scroll, i.e., deactivate the scroll bar "thumb", and then look to see what data entry in the data table the scroll is on.

As an example, using a currently available scrollbar, or other similar mechanism, a user wishing to find a payroll record data entry for "Savannah McKay" that is sorted alphabetically by last name may currently activate the scroll bar "thumb" until the traditional scrollbar position symbol indicates the position of the scroll is about ½ of the way down the data table of employee data entries. The user would then release or deactivate the scroll bar "thumb" and look to see what data entry the scroll is actually on. In this specific example, given that "M" is about ½ of the way through the alphabet, ½ way through the data table would be a good guess. However, it is highly unlikely that the user will deactivate/stop/pause the scroll precisely on the record for Savannah McKay and, in many cases, the user may not even be close. For instance, in the specific case introduced above, the user's assumption that "M" equates to ½ of the way down the data table is only valid if there are roughly the same number of people having last names beginning with each letter of the alphabet. Consequently, using currently available systems with traditional scroll position symbols, it is far more likely the user will have to stop the scroll, note where in the data table the scroll is positioned, and then begin the scroll again to get closer to the "M" listings, and then repeat the process until the data entry for Savannah McKay is finally reached.

Clearly, the situation described above associated with traditional scroll position symbols is relatively inefficient and far from ideal in that, while the user is scrolling a data table, the user does not actually know what data entry the scroll is positioned on as the scrolling is taking place, i.e., the user is not shown the data entry at the scroll's current position before the user deactivates the scroll and stops the process.

To address this issue, some current scrolling systems include a "visual data scrollbar position indicator". Using currently available visual data scrollbar position indicators, all, or part of, the data present in a specified data display field of each data entry is selected as display data and then, as each entry is scrolled trough, a predetermined portion of the display data present in the specified data field for that entry is displayed in addition to, or in place of, the traditional scrollbar position symbol.

For instance, as a specific example, using a current scrolling system that includes a current visual data scrollbar position indicator, when data entries in a data table are sorted alphabetically by last name, the last name field could be selected as the data display field. In this case, using a current visual data scrollbar position indicator, a predetermined portion, such as all of, or part of, the data present in the last name field of each data entry, i.e., all, or part of the data "Last Name" would be displayed as display data in addition to, or in place or, the traditional scrollbar position symbol as each entry is scrolled trough.

More specifically, continuing with the example introduced above, using a current visual data scrollbar position indicator, a predetermined portion of the data present in the last name field of the data entry for Savannah McKay, i.e., a predetermined portion of "McKay" such as "M", "Mc", "McK" or "McKay", would be displayed in addition to, or in place or, the traditional scrollbar position symbol as the data entry for Savannah McKay is scrolled trough, or past.

The currently available visual data scrollbar position indicators represent a significant improvement over traditional scrolling systems and traditional scrollbar position symbols. However, currently available visual data scrollbar position indicators have some significant limitations, not the least of which is the fact that, using currently available visual data scrollbar position indicators, the portion, and/or amount, of display data to be displayed in addition to, or in place or, the traditional scrollbar position symbol, is determined in advance, i.e., predetermined, often by the scrolling system itself, and is a static amount, or style, that, once chosen, is not flexible or dynamic. Consequently, using currently available visual data scrollbar position indicators, the portion, and/or amount, of data selected to be displayed as display data is not sensitive to any "real world" variables such as, the number of data entries being scrolled, what data display field has been selected and the actual display data being displayed, how fast the selected display data is changing, or any analysis of how much display data the user can realistically actually absorb, or even see, while scrolling through the data entries in the data table. Or course, this is a more pronounced issue for large data tables containing a large number of data entries.

For instance, in cases where the user is scrolling through multiple data entries in a large data table, if the selected display data is changing quickly, and/or significantly, from data entry-to-data entry, then displaying a predetermined "one-size-fits all" number of characters, as is done with currently available visual data scrollbar position indicators, can result in a visual data scrollbar position indicator where the display data displayed to a user is a "blur" to the user, and/or is virtually unreadable, or at least not readily absorbed, by the user as the user scrolls through the data table. As a result, in many instances, the currently available visual data scrollbar position indicators are no more useful to the user than the traditional scrolling systems and traditional scrollbar position symbols because, for all practical purposes, the display data cannot be discerned while the user is scrolling through the data table.

As a specific example, using a current visual data scrollbar position indicator, assume the data display field is selected to be the "last name" data field, and the display data is predetermined to be the entire last name. In this illustrative case, if the data in the last name data fields of the data entries quickly switches from entry to entry, for instance, if there are very few entries involving the same, or similar, last names, then as the user scrolls through the data table the user will not have time to mentally process, or even see, what full last name is being displayed in the current visual data scrollbar position indicator, or, in many cases, discern even the first letter of the display data. Consequently, as with the traditional scrolling systems and traditional scrollbar position symbols, the user would have to release or deactivate the scroll bar "thumb" and look to see what data entry the scroll was actually on and then repeat the process until the desired data entry was finally reached.

As a result of the situation described above, even using scrolling systems implementing a current visual data scrollbar position indicator, it is often likely the user will have to stop the scroll, note where in the data table the scroll is positioned, and then begin the scroll again to get closer to a desired data entry. Therefore, users are currently often spending far too much time finding a desired data entry in a data table.

SUMMARY

In accordance with one embodiment, a system and method for providing an intelligent visual data scrollbar position indicator includes a process for providing an intelligent visual data scrollbar position indicator whereby data is organized into a data table of two or more data entries with each data entry having one or more data fields. In one embodiment, the data table is displayed to a user in a data table user interface display. In one embodiment, a scrolling capability is provided whereby a user can scroll through the data entries in the data table via the data table user interface display and one or more user interface devices. In one embodiment, the scrolling capability includes an icon, or other scrolling activation symbol, displayed in the data table user interface display that is used to activate the scrolling capability. In one embodiment, at least one data field of the one or more data fields associated with the two or more data entries is selected as a "data display field". In one embodiment, a portion of the data in the selected data display field is selected as "display data" based, at least in part, on the data display field selected and the rate of change of the data in the selected data display field. In one embodiment, when the scrolling activation symbol is activated by a user, and the scrolling capability is activated, as the data entries are being scrolled through, the selected display data included in the selected data display field is displayed to the user as each data entry is passed, i.e., scrolled through, and as the scrolling is in progress, i.e., while the scrolling function is still activated.

Using the system and method for providing an intelligent visual data scrollbar position indicator discussed herein, the amount of display data shown to a user, and/or a display data display style, is variable and is determined by the data display field selected, and/or the "velocity" at which the data in the selected data display field changes. Consequently, the velocity, or rate of change, of the display data seen by the user is adjusted to enable the user to clearly discern, and/or absorb, the display data. Therefore, using the system and method for providing an intelligent visual data scrollbar position indicator discussed herein, it is more likely the user will be able to find the desired data entry quickly, and on a first stop, and less likely the user will have to stop the scroll, note where in the data table the scroll is positioned, and then begin the scroll again to get closer to a desired data entry.

In addition, as discussed in more detail below, using the below embodiments, with little or no modification and/or user input, there is considerable flexibility, adaptability, and opportunity for customization to meet the specific needs of various users under numerous circumstances.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for providing an intelligent visual data scrollbar position indicator includes a process for providing an intelligent visual data scrollbar position indicator whereby data is organized into a data table of two or more data entries with each data entry having one or more data fields.

In one embodiment, the data is organized into a data table of two or more data entries with each data entry having one or more data fields by one or more data management systems.

As used herein, the term "data management system" includes, but is not limited to: online, web-based, and/or computing system implemented accounting and/or invoicing systems, packages, programs, modules, or applications; online, web-based, and/or computing system implemented financial management systems, packages, programs, modules, or applications; online, web-based, and/or computing system implemented business financial management systems, packages, programs, modules, or applications; online, web-based, and/or computing system implemented banking systems, packages, programs, modules, or applications; online, web-based, and/or computing system implemented small business financial management systems, packages, programs, modules, or applications; online, web-based, and/or computing system implemented general business systems, packages, programs, modules, or applications; online, web-based, and/or computing system implemented financial institution financial management systems, packages, programs, modules, or applications; online, web-based, and/or computing system implemented tax preparation systems, packages, programs, modules, or applications; online, web-based, and/or computing system implemented business and/or point of sale systems, packages, programs, modules, or applications; online, web-based, and/or computing system implemented healthcare management systems, packages, programs, modules, or applications and various other electronic data driven data management systems, packages, programs, modules, or applications, whether known at the time of filling or as developed later.

In one embodiment, the data table is displayed to a user in a data table user interface display displayed on one or more computing systems accessible by the user.

As used herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In one embodiment, a scrolling capability is provided by one or more processors associated with one or more computing systems whereby a user can scroll through the data entries in the data table via the data table user interface display and one or more user interface devices such as, but not limited to, a mouse, a keyboard, a touchpad, a voice recognition system, or any other device and/or process for converting user actions into computer readable instructions/commands.

In one embodiment, the scrolling capability includes an icon, or other scrolling activation symbol, displayed in the data table user interface display that is used to activate the scrolling capability via the data table user interface display and one or more user interface devices such as, but not limited to a mouse, a keyboard, a touchpad, a voice recognition system, or any other device and/or process for converting user actions into computer readable instructions/commands.

In one embodiment, at least one data field of the one or more data fields associated with the two or more data entries is selected as a "data display field".

In various embodiments, the data display field is selected manually by the user.

In various embodiments, the data display field is selected automatically by the process for providing an intelligent visual data scrollbar position indicator based on the data management system generating the data table being viewed.

In various embodiments, the data display field is selected semi-automatically by the process for providing an intelligent visual data scrollbar position indicator based on the data management system generating the data table being viewed and subject to user input, review, and/or approval.

In various embodiments, the data display field is selected automatically by a data management system, and/or a process for providing an intelligent visual data scrollbar position indicator, based on the previous data display field selections made by the user.

In various embodiments, the data display field is selected semi-automatically by a data management system, and/or a process for providing an intelligent visual data scrollbar position indicator, based on the previous data display field selections made by the user and subject to user input, review, and/or approval.

In various embodiments, the data display field is selected automatically by a data management system, and/or a process for providing an intelligent visual data scrollbar position indicator, based on the type of data table being viewed.

In various embodiments, the data display field is selected semi-automatically by a data management system, and/or a process for providing an intelligent visual data scrollbar position indicator, based on the type of data table being viewed and subject to user input, review, and/or approval.

In various embodiments, the data display field is selected automatically by a data management system, and/or a process for providing an intelligent visual data scrollbar position indicator, based on analysis by the process for providing an intelligent visual data scrollbar position indicator such as what type of data is being viewed, other historical actions taken by the user, and/or one or more other selection parameters.

In various embodiments, the data display field is selected by any means, mechanism, process, procedure, or combination of means, mechanisms, processes, procedures, as discussed herein, and/or as known in the art at the time of filing, and/or as developed after the time of filing.

In one embodiment, the data indicating the selected data display field for the displayed data table is stored and/or associated with the displayed data table.

In various embodiments, a portion of the data in the selected data display field is selected as "display data". In various embodiments, the determination of size, or amount, of display data is made based, at least in part, on the data display field selected and/or the rate of change of the data in the selected data display field.

In various embodiments, the determination of the size, or amount, for instance the number of alpha-numeric characters of the display data, is made based, at least in part, on the data display field selected and/or the rate of change of the data in the selected data display field such that the amount of display data corresponds to the expected rate of change, or calculated rate of change, associated with the data in the selected data display field so that the rate of change of the display data seen by the user is adjusted to enable the user to more clearly discern, and/or absorb, the display data.

In one embodiment, the determination of the size, or amount, of display data, and/or a display data display style, is made based on the selected data display field and known or average rates of data change associated with the data in the selected data display field.

For instance, if the rate of data change associated with a selected data display field were known to, on average, be high, i.e., the data in the selected data display field is expected to change quickly as the data entries are scrolled, then the size, or amount, of display data, and/or a display data display style, would be chosen to be minimal, such as a first letter or character of the data, so that the rate of change of the display data would be low enough for the user to read, and/or absorb, what was being displayed by the display data.

On the other hand, if the rate of data change associated with a selected data display field were known to, on average, be low, i.e., the data in the selected data display field is expected to change slowly as the data entries are scrolled, then the size, or amount, of display data, and/or a display data display style, would be chosen to be larger, such as full words or even the entire amount of data in the selected data display field, in order to provide the user more detailed display data.

In one embodiment, once the data display field is selected, the user's actual data in the data display field of all the data entries in the data table is analyzed to determine an actual rate of change of the user's actual data in the selected data display field. Then, in one embodiment, the determination of the size, or amount, of display data, and/or a display data display style, is made based on the selected data display field and this determined actual rate of change of the user's actual data in the selected data display field.

For instance, if the determined actual rate of change associated with a selected data display field were calculated to be high, i.e., the data in the selected data display field changes quickly as the data entries are scrolled, then the size, or amount, of display data, and/or a display data display style, would be chosen to be minimal, such as a first letter or character of the data, so that the rate of change of the display data would be low enough for the user to read, and/or absorb, what was being displayed by the display data.

On the other hand, if the determined actual rate of change associated with a selected data display field were calculated to be low, i.e., the data in the selected data display field changes slowly as the data entries are scrolled, then the size, or amount, of display data, and/or a display data display style, would be chosen to be larger, such as full words or even the entire amount of data in the selected data display field, in order to provide the user more detailed display data.

In one embodiment, the rate at which a user is scrolling through a data table is monitored and the determination of the size, or amount, of display data is made based on the scroll rate used by the user to scroll through the data entries in the data table.

For instance, if the scroll rate is determined to be high, i.e., the user is scrolling the data table quickly, then the size, or amount, of display data, and/or a display data display style, would be chosen to be minimal, such as a first letter or character of the data, so that the rate of change of the display data would be low enough for the user to read, and/or absorb, what was being displayed by the display data.

On the other hand, if the scroll rate is determined to be low, i.e., the user is scrolling the data table slowly, then the size, or amount, of display data, and/or a display data display style, would be chosen to be larger, such as full words or even the entire amount of data in the selected data display field, in order to provide the user more detailed data.

In one embodiment, once the size, or amount, of display data, and/or a display data display style, is selected, then, when the user activates the scrolling activation symbol, i.e., when the scrolling capability is activated, as the data entries in the data table are being scrolled through, the selected display data included in the selected data display field of each data entry is displayed to the user as each data entry is passed, i.e., scrolled through, and as the scrolling is in progress, i.e., while the scrolling function is still activated.

In one embodiment, the display data associated with each data entry in the data table is displayed as a semi-transparent "Heads Up Display" (HUD) in the same data table user interface display as the data entries and data table.

In one embodiment, the display data associated with each data entry in the data table is displayed as text in a text window or other display associated with the data table display, and/or a scrolling symbol, and is displayed in the same data table user interface display as the data entries and data table.

In one embodiment, the display data associated with each data entry in the data table is displayed as a replacement symbol for a scrolling symbol in the data table user interface display.

In one embodiment, the display data associated with each data entry in the data table is displayed in a separate section, or window, of the data table user interface display.

Hardware System Architecture

Figure 1:
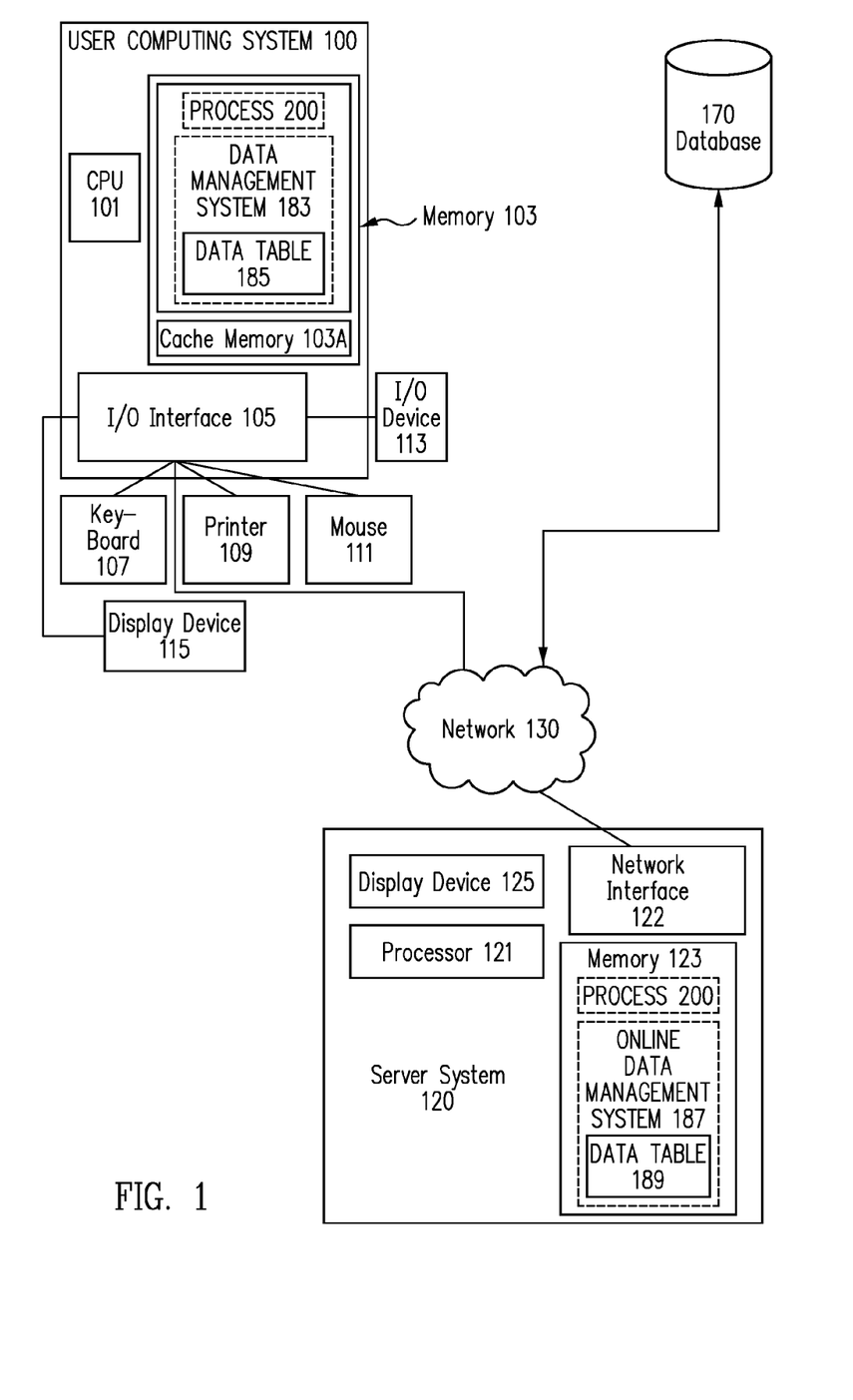
FIG. 1 is a block diagram of an exemplary hardware architecture for implementing one embodiment.

FIG. 1 is a block diagram of an exemplary hardware architecture for implementing one embodiment of a system and method for providing an intelligent visual data scrollbar position indicator, such as exemplary process 200 discussed herein, that includes: a user computing system 100; a server system 120; and a database 170, all operatively coupled by a network 130.

As seen in FIG. 1, user computing system 100 typically includes a central processing unit (CPU) 101, an input/output (I/O) interface 105, and a memory system 103, including cache memory 103A. In one embodiment, memory system 103 includes all, or part of, a process for providing an intelligent visual data scrollbar position indicator, such as exemplary process 200 discussed below.

As also seen in FIG. 1, in one embodiment, user computing system 100 and memory system 103 includes all, or part of, includes computing system implemented data management system 183. In one embodiment, computing system implemented data management system 183 represents any one or more data management systems such as, but is not limited to: computing system implemented accounting and/or invoicing systems, packages, programs, modules, or applications; computing system implemented personal financial management systems, packages, programs, modules, or applications; computing system implemented business financial management systems, packages, programs, modules, or applications; computing system implemented banking systems, packages, programs, modules, or applications; computing system implemented general business systems, packages, programs, modules, or applications; computing system implemented marketing device distribution systems, packages, programs, modules, or applications; computing system implemented tax preparation systems, packages, programs, modules, or applications; computing system implemented point of sale systems, packages, programs, modules, or applications; computing system implemented accounting and/or invoicing systems, packages, programs, modules, or applications; computing system implemented healthcare management systems, packages, programs, modules, or applications; and various other electronic data driven data management systems, packages, programs, modules, or applications, whether known at the time of filling or as developed later.

As also seen in FIG. 1, in one embodiment, user computing system 100 and memory system 103 includes data table 185 that, in one embodiment, is created by computing system implemented data management system 183 and includes one or more data entries and a scrolling capability including an intelligent visual data scrollbar position indicator (not shown in FIG. 1).

User computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, user computing system 100, whether available or known at the time of filing or as later developed.

As discussed in more detail below, in one embodiment, process for providing an intelligent visual data scrollbar position indicator 200 and/or computing system implemented data management system 183 are entered, in whole, or in part, into user computing system 100 via I/O device 113, such as from a CD, DVD, floppy disk, portable hard drive, memory stick, download site, or other medium and/or computer program product as defined herein.

In one embodiment, user computing system 100 is a computing system used and/or accessible by another computing system, Internet appliance, any other device, or any desired combination of devices, that includes components that can execute all, or part, of process for providing an intelligent visual data scrollbar position indicator 200, in accordance with at least one of the embodiments as described herein.

Also shown in FIG. 1 is exemplary database 170. In one embodiment, database 170 is any data storage device, a designated server system or computing system, or a designated portion of one or more server systems or computing systems, such as user computing system 100, and/or server system 120, or a distributed database, or an external and/or portable hard drive. In one embodiment, database 170 is a dedicated mass storage device implemented in software, hardware, or a combination of hardware and software. In one embodiment, database 170 is a web-based function.

In one embodiment, database 170 is under the control of a process for providing an intelligent visual data scrollbar position indicator, such as exemplary process 200, and/or a computing system implemented process, such computing system implemented data management system 183 and/or an online process such as online data management system 187.

In one embodiment, user computing system 100 and database 170 are coupled to a server system 120 through network 130. In one embodiment, server system 120 typically includes a server system display device 125, a server system processor 121, a server system memory 123, and a server system network interface 122.

In one embodiment, server system 120 is used, at least in part, as an exchange server. In one embodiment, server system 120 is used in a station-to-station arrangement, such as a peer-to-peer, or hybrid peer-to peer, arrangement, as an indexing and/or central server used to connect a first computing system, such as user computing system 100, and a second computing system.

In one embodiment, server system 120 is an application server. In one embodiment, server system 120 is used, controlled, and/or accessible by, a provider of a system and process for providing an intelligent visual data scrollbar position indicator, and/or a system and process for providing an intelligent visual data scrollbar position indicator, such as process for providing an intelligent visual data scrollbar position indicator 200.

In one embodiment, server system 120 and memory system 123 includes all, or part of, a process for providing an intelligent visual data scrollbar position indicator, such as exemplary process 200 discussed below.

As also seen in FIG. 1, in one embodiment, server system 120 and memory system 123 includes all, or part of, online data management system 187. In one embodiment, online data management system 187 represents any one or more data management systems such as, but is not limited to: online or web-based accounting and/or invoicing systems, packages, programs, modules, or applications; online or web-based personal financial management systems, packages, programs, modules, or applications; online or web-based business financial management systems, packages, programs, modules, or applications; online or web-based banking systems, packages, programs, modules, or applications; online or web-based computing system implemented general business systems, packages, programs, modules, or applications; online or web-based marketing device distribution systems, packages, programs, modules, or applications; online or web-based tax preparation systems, packages, programs, modules, or applications; online or web-based point of sale systems, packages, programs, modules, or applications; online or web-based healthcare management systems, packages, programs, modules, or applications; and various other electronic data driven online data management systems, packages, programs, modules, or applications, whether known at the time of filling or as developed later.

As also seen in FIG. 1, in one embodiment, server system 120 and memory system 123 includes online data table 189 that, in one embodiment, is created by online data management system 187 and includes one or more data entries and a scrolling capability including an intelligent visual data scrollbar position indicator (not shown in FIG. 1).

Network 130 can be any network or network system that is of interest to a user such as, a peer-to-peer network, a hybrid peer-to-peer network, a Local Area Network (LAN), a Wide Area Network (WAN), a public network, such as the Internet, a private network, a combination of different network types, or any other wireless, wired, and/or a wireless and wired combination networks capable of allowing communication between two or more computing systems, whether available or known at the time of filing or as later developed.

In one embodiment, all, or part, of user computing system 100, database 170, server system 120 and/or network 130, and any associated functions and applications, are part of a cloud computing environment.

Those of skill in the art will readily recognize that the components shown in FIG. 1, such as user computing system 100, database 170, server system 120, and their respective components, are shown for illustrative purposes only and that architectures with more or fewer components can implement, and benefit from, the invention. Moreover, one or more components of user computing system 100, database 170, and server system 120 may be located remotely from their respective system and accessed via network, as discussed herein. In addition, the particular type of, and configuration of, user computing system 100, database 170, and server system 120 are not relevant.

As discussed in more detail below, in one embodiment, a process for providing an intelligent visual data scrollbar position indicator, such as process for providing an intelligent visual data scrollbar position indicator 200, and/or a data management system, such as computing system implemented data management system 183 and/or online data management system 187, are stored, in whole, or in part, in memory system 103 and/or cache memory 103A, of user computing system 100, and/or in server memory system 123 of server system 120 and/or in database 170, and executed on user computing system 100. As used herein, a memory refers to a volatile memory, a non-volatile memory, or any combination of the two.

In one embodiment, a process for providing an intelligent visual data scrollbar position indicator, such as process for providing an intelligent visual data scrollbar position indicator 200, and/or a data management system, such as computing system implemented data management system 183 and/or online data management system 187, are computer applications or processes and/or data implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and data transmitted over a network, such as network 130 of FIG. 1, or other media or process capable of delivering computer readable data representing computer readable code, whether available or known at the time of filing or as later developed. This medium may belong to a computing system, such as user computing system 100 of FIG. 1, described above. However, in some embodiments, the medium also may be removable and/or remote from the computing system.

For example, all, or part, of a process for providing an intelligent visual data scrollbar position indicator, such as process for providing an intelligent visual data scrollbar position indicator 200, and/or a data management system, such as computing system implemented data management system 183 and/or online data management system 187, may be stored in a memory that is physically located in a location, such as server system memory 123, or database 170, of FIG. 1, different from a computing system, such as user computing system 100, utilizing a process for providing an intelligent visual data scrollbar position indicator, such as process for providing an intelligent visual data scrollbar position indicator 200, and/or a data management system, such as computing system implemented data management system 183 and/or online data management system 187. In one embodiment, all, or part, of a process for providing an intelligent visual data scrollbar position indicator, such as process for providing an intelligent visual data scrollbar position indicator 200, and/or a data management system, such as computing system implemented data management system 183 and/or online data management system 187, may be stored in a memory that is physically located, separate from the computing system's processor(s), such as CPU 101 of FIG. 1, and the computing system CPUs can be coupled to the memory in a client-server system, such as server system 120 of FIG. 1, or, alternatively, via connection to another computer, such as user computing system 100, via modems and analog lines, digital interfaces and a digital carrier line, or wireless or cellular connections.

In one embodiment, the computing systems and/or server systems, such as user computing system 100 and/or server system 120 of FIG. 1, running and/or utilizing and/or storing all, or part, of a process for providing an intelligent visual data scrollbar position indicator, such as process for providing an intelligent visual data scrollbar position indicator 200, and/or a data management system, such as computing system implemented data management system 183 and/or online data management system 187, is a portable computer, a workstation, a two-way pager, a cellular telephone, a smart phone, a digital wireless telephone, a PDA, a server computer, an Internet appliance, or any other device that includes components that can execute all, or part, of a process for providing an intelligent visual data scrollbar position indicator, such as process for providing an intelligent visual data scrollbar position indicator 200, and/or a data management system, such as computing system implemented data management system 183 and/or online data management system 187, in accordance with at least one of the embodiments as described herein. Similarly, in another embodiment, a process for providing an intelligent visual data scrollbar position indicator, such as process for providing an intelligent visual data scrollbar position indicator 200, and/or a data management system, such as computing system implemented data management system 183 and/or online data management system 187, may be implemented on, and/or run on/by, and/or stored on, a computing system and/or server system that is comprised of multiple different computers, wireless devices, cellular telephones, digital telephones, two-way pagers, personal digital assistants, server computers, or any desired combination of these devices, that are coupled to perform the processes and/or operations as described herein.

Process

Herein, the terms "user", "consumer", "individual", are used interchangeably to denote any party interfacing and/or interacting with a process for providing an intelligent visual data scrollbar position indicator, and/or an authorized agent of any party interfacing and/or interacting with a process for providing an intelligent visual data scrollbar position indicator, and/or any other authorized party associated with any party interfacing and/or interacting with a process for providing an intelligent visual data scrollbar position indicator.

As used herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "data management system" includes, but is not limited to: computing system implemented accounting and/or invoicing systems, packages, programs, modules, or applications; personal financial management systems, packages, programs, modules, or applications; business financial management systems, packages, programs, modules, or applications; computing system implemented banking systems, packages, programs, modules, or applications; computing system implemented small business financial management systems, packages, programs, modules, or applications; computing system implemented general business systems, packages, programs, modules, or applications; computing system implemented financial institution financial management systems, packages, programs, modules, or applications; computing system implemented tax preparation systems, packages, programs, modules, or applications; computing system implemented business and/or point of sale systems, packages, programs, modules, or applications; computing system implemented healthcare management systems, packages, programs, modules, or applications and various other electronic data driven data management systems, packages, programs, modules, or applications, whether known at the time of filling or as developed later.

As used herein, the term "computing system implemented financial management system" includes, but is not limited to: computing system implemented personal and small business financial management systems, packages, programs, modules, or applications; computing system implemented business systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications, whether known at the time of filling or as developed later.

As used herein, the term "network" includes, but is not limited to, any network or network system such as, but not limited to, any one or more of the following, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes, but is not limited to, any data storage mechanism known at the time of filing or as developed thereafter, such as, but not limited to, any one or more of the following: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

In accordance with one embodiment, a system and method for providing an intelligent visual data scrollbar position indicator includes a process for providing an intelligent visual data scrollbar position indicator whereby data is organized into a data table of two or more data entries with each data entry having one or more data fields. In one embodiment, the data table is displayed to a user in a data table user interface display. In one embodiment, a scrolling capability is provided whereby a user can scroll through the data entries in the data table via the data table user interface display and one or more user interface devices. In one embodiment, the scrolling capability includes an icon, or other scrolling activation symbol, displayed in the data table user interface display that is used to activate the scrolling capability. In one embodiment, at least one data field of the one or more data fields associated with the two or more data entries is selected as a "data display field". In one embodiment, a portion of the data in the selected data display field is selected as "display data" based, at least in part, on the data display field selected and the rate of change of the data in the selected data display field. In one embodiment, when the scrolling activation symbol is activated by a user, and the scrolling capability is activated, as the data entries are being scrolled through, the selected display data included in the selected data display field is displayed to the user as each data entry is passed, i.e., scrolled through, and as the scrolling is in progress, i.e., while the scrolling function is still activated.

Figure 2:
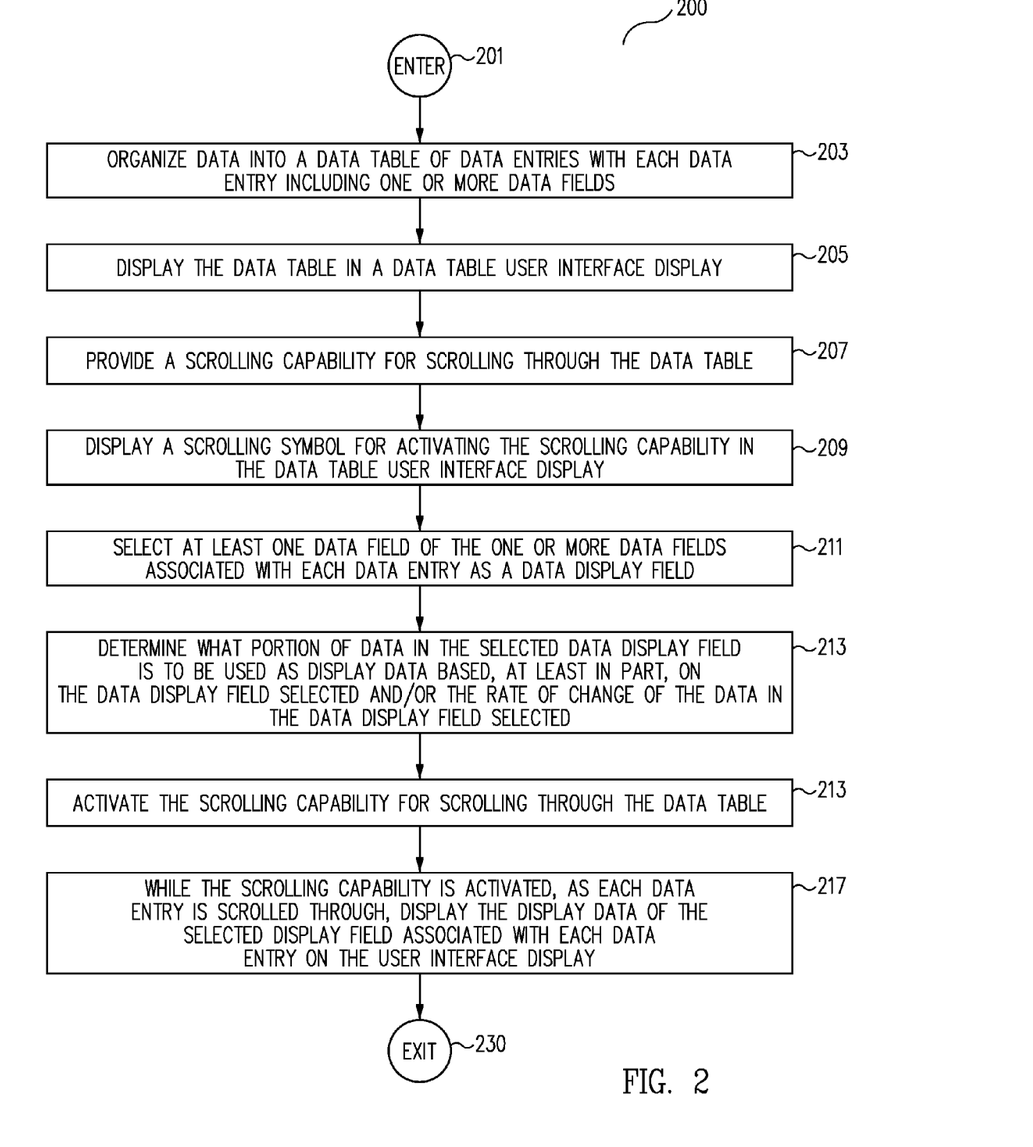
FIG. 2 is a flow chart depicting a process for providing an intelligent visual data scrollbar position indicator in accordance with one embodiment.

FIG. 2 a flow chart depicting a process for providing an intelligent visual data scrollbar position indicator 200 in accordance with one embodiment. Process for providing an intelligent visual data scrollbar position indicator 200 begins at ENTER OPERATION 201 of FIG. 2 and process flow proceeds to ORGANIZE DATA INTO A DATA TABLE OF DATA ENTRIES WITH EACH DATA ENTRY INCLUDING ONE OR MORE DATA FIELDS OPERATION 203.

In one embodiment, at ORGANIZE DATA INTO A DATA TABLE OF DATA ENTRIES WITH EACH DATA ENTRY INCLUDING ONE OR MORE DATA FIELDS OPERATION 203 data is organized into data entries with each data entry including at least one data entry field and the data entries are arranged in a data table of the data entries.

In one embodiment, at ORGANIZE DATA INTO A DATA TABLE OF DATA ENTRIES WITH EACH DATA ENTRY INCLUDING ONE OR MORE DATA FIELDS OPERATION 203 data is organized into data entries with each data entry including at least one data entry field and the data entries are arranged in a data table of the data entries by one or more processors, such as CPU 101, and/or processor 121, of FIG. 1, associated with one or more computing systems, such as user computing system 100 and/or server system 120, of FIG. 1.

Returning to FIG. 2, in one embodiment, at ORGANIZE DATA INTO A DATA TABLE OF DATA ENTRIES WITH EACH DATA ENTRY INCLUDING ONE OR MORE DATA FIELDS OPERATION 203 data is organized into data entries with each data entry including at least one data entry field and the data entries are arranged in a data table of the data entries such as data table 185 of FIG. 1.

Returning to FIG. 2, in one embodiment, at ORGANIZE DATA INTO A DATA TABLE OF DATA ENTRIES WITH EACH DATA ENTRY INCLUDING ONE OR MORE DATA FIELDS OPERATION 203 data is organized into data entries with each data entry including at least one data entry field and the data entries are arranged in a data table of the data entries by a data management system, such as computing system implemented data management system 183 and/or online data management system 187 of FIG. 1, or any data management system as discussed herein, and/or as known in the art at the time of filing, and/or as developed after the time of filing.

As used herein, the term "data management system" includes, but is not limited to: online, web-based, and/or computing system implemented accounting and/or invoicing systems, packages, programs, modules, or applications; online, web-based, and/or computing system implemented financial management systems, packages, programs, modules, or applications; online, web-based, and/or computing system implemented business financial management systems, packages, programs, modules, or applications; online, web-based, and/or computing system implemented banking systems, packages, programs, modules, or applications; online, web-based, and/or computing system implemented small business financial management systems, packages, programs, modules, or applications; online, web-based, and/or computing system implemented general business systems, packages, programs, modules, or applications; online, web-based, and/or computing system implemented financial institution financial management systems, packages, programs, modules, or applications; online, web-based, and/or computing system implemented tax preparation systems, packages, programs, modules, or applications; online, web-based, and/or computing system implemented business and/or point of sale systems, packages, programs, modules, or applications; online, web-based, and/or computing system implemented healthcare management systems, packages, programs, modules, or applications and various other electronic data driven data management systems, packages, programs, modules, or applications, whether known at the time of filling or as developed later.

Arrangements of data into data entries with each data entry including at least one data entry field are well known in the art. In addition, in various data tables, data entries are assigned a "sort order" or "sort field" which indicates which column, or data field, is used to sort the data entries. In some cases there is a primary and secondary sort field whereby the primary sort is the first field sorted and the secondary sort is used when the primary fields of multiple data entries are identical.

For example, as a specific example, a given set of data entries may be sorted alphabetically by last name and the last name field may be selected as the primary sort field for the data entries. In addition, a given set of data entries may be sorted alphabetically by last name and then by first name for identical last name entries. In this instance, the last name field may be selected as the primary sort field for the data entries and the first name field may be selected as the secondary sort field for the data entries.

Returning to FIG. 2, in one embodiment, once data is organized into data entries with each data entry including at least one data entry field and the data entries are arranged in a data table of the data entries at ORGANIZE DATA INTO A DATA TABLE OF DATA ENTRIES WITH EACH DATA ENTRY INCLUDING ONE OR MORE DATA FIELDS OPERATION 203, process flow proceeds to DISPLAY THE DATA TABLE IN A DATA TABLE USER INTERFACE DISPLAY OPERATION 205.

In one embodiment, at DISPLAY THE DATA TABLE IN A DATA TABLE USER INTERFACE DISPLAY OPERATION 205 the data table of ORGANIZE DATA INTO A DATA TABLE OF DATA ENTRIES WITH EACH DATA ENTRY INCLUDING ONE OR MORE DATA FIELDS OPERATION 203 is displayed in a data table user interface display displayed on a display device of a computing system accessible by a user.

As used herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In one embodiment, at DISPLAY THE DATA TABLE IN A DATA TABLE USER INTERFACE DISPLAY OPERATION 205 the data table of ORGANIZE DATA INTO A DATA TABLE OF DATA ENTRIES WITH EACH DATA ENTRY INCLUDING ONE OR MORE DATA FIELDS OPERATION 203 is displayed in a data table user interface display displayed on a display device, such as display device 115 of FIG. 1, of a computing system, such as user computing system 100 of FIG. 1.

Returning to FIG. 2, in one embodiment, at DISPLAY THE DATA TABLE IN A DATA TABLE USER INTERFACE DISPLAY OPERATION 205 the data table of ORGANIZE DATA INTO A DATA TABLE OF DATA ENTRIES WITH EACH DATA ENTRY INCLUDING ONE OR MORE DATA FIELDS OPERATION 203 is displayed in a data table user interface display displayed on a display device of a computing system accessible by a user under the direction of one or more processors, such as CPU 101, and/or processor 121, of FIG. 1, associated with one or more computing systems, such as user computing system 100 and/or server system 120, of FIG. 1.

Figure 3:
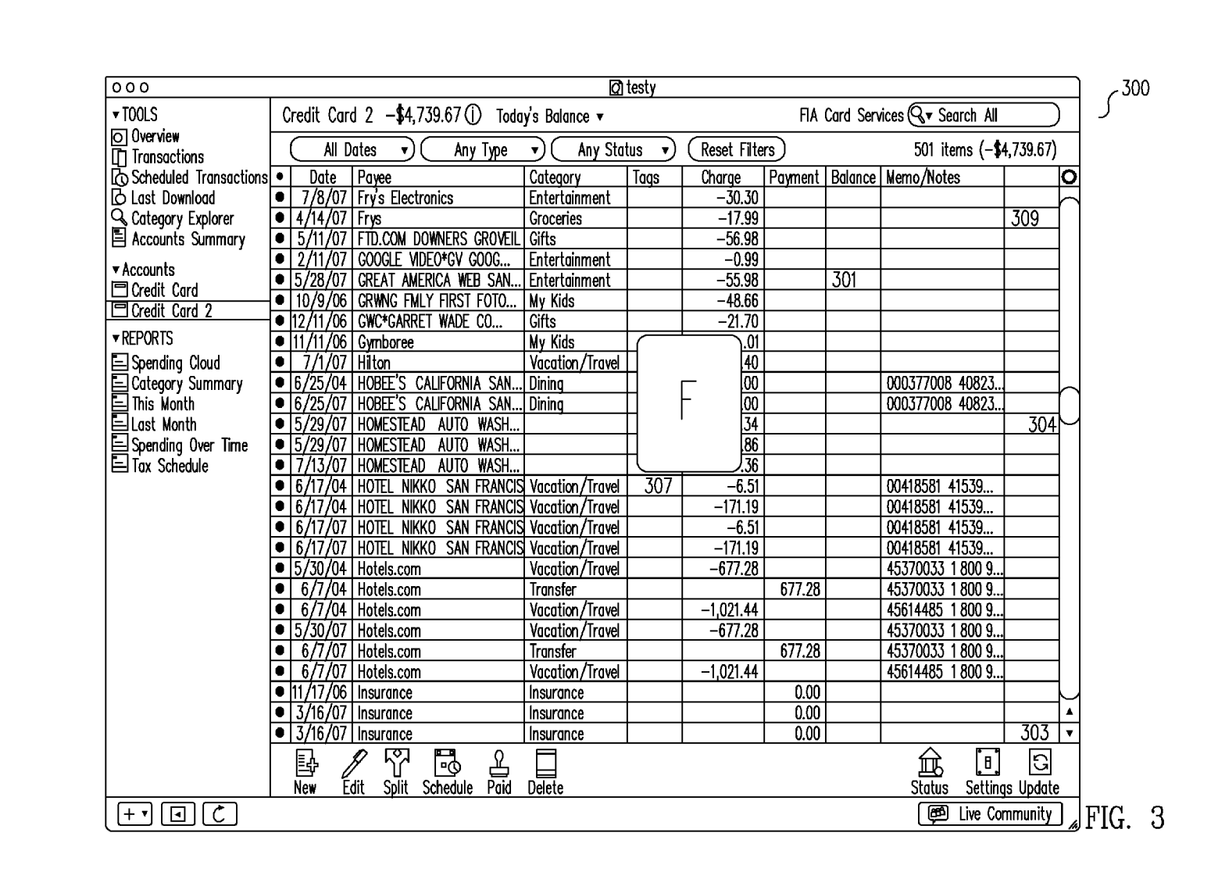
FIG. 3 is one specific example of a data table user interface display generated in accordance with one embodiment and including one example of one embodiment of an intelligent visual data scrollbar position indicator.

FIG. 3 shows one specific example of a data table user interface display 300 displayed on a display device 115 (FIG. 1) generated in accordance with one embodiment and including one example of one embodiment of a data table 301 (FIG. 3). As shown in FIG. 3, data table 301 includes multiple data entries such as data entry 309 with each data entry including eight data entry fields: date; payee; category; tags; charge; payment; balance; and memo/notes.

As also seen in FIG. 3, the data entries in data table 301 are sorted by payee name alphabetically.

Returning to FIG. 2, in one embodiment, once the data table of ORGANIZE DATA INTO A DATA TABLE OF DATA ENTRIES WITH EACH DATA ENTRY INCLUDING ONE OR MORE DATA FIELDS OPERATION 203 is displayed in a data table user interface display displayed on a display device of a computing system accessible by a user at DISPLAY THE DATA TABLE IN A DATA TABLE USER INTERFACE DISPLAY OPERATION 205, process flow proceeds to PROVIDE A SCROLLING CAPABILITY FOR SCROLLING THROUGH THE DATA TABLE OPERATION 207.

In one embodiment, at PROVIDE A SCROLLING CAPABILITY FOR SCROLLING THROUGH THE DATA TABLE OPERATION 207 a scrolling capability is provided whereby a user can scroll through the data table of ORGANIZE DATA INTO A DATA TABLE OF DATA ENTRIES WITH EACH DATA ENTRY INCLUDING ONE OR MORE DATA FIELDS OPERATION 203 displayed at DISPLAY THE DATA TABLE IN A DATA TABLE USER INTERFACE DISPLAY OPERATION 205.

Methods, means, mechanisms, processes, and procedures for providing scrolling capabilities are well known in the art. Consequently, a more detailed discussion of specific methods, means, mechanisms, processes, and procedures for providing scrolling capabilities is omitted here in order to avoid detracting from the description.

In one embodiment, once a scrolling capability is provided whereby a user can scroll through the data table of ORGANIZE DATA INTO A DATA TABLE OF DATA ENTRIES WITH EACH DATA ENTRY INCLUDING ONE OR MORE DATA FIELDS OPERATION 203 displayed at DISPLAY THE DATA TABLE IN A DATA TABLE USER INTERFACE DISPLAY OPERATION 205 at PROVIDE A SCROLLING CAPABILITY FOR SCROLLING THROUGH THE DATA TABLE OPERATION 207, process flow proceeds to DISPLAY A SCROLLING SYMBOL FOR ACTIVATING THE SCROLLING CAPABILITY IN THE DATA TABLE USER INTERFACE DISPLAY OPERATION 209.

In one embodiment, at DISPLAY A SCROLLING SYMBOL FOR ACTIVATING THE SCROLLING CAPABILITY IN THE DATA TABLE USER INTERFACE DISPLAY OPERATION 209 a scrolling display, icon, symbol, or similar function, which is capable of being activated by the user is provided.

In one embodiment, at DISPLAY A SCROLLING SYMBOL FOR ACTIVATING THE SCROLLING CAPABILITY IN THE DATA TABLE USER INTERFACE DISPLAY OPERATION 209 the scrolling display, icon, symbol, or similar function, is capable of being activated by the user via a user interface device such as, but not limited to, a mouse, such as mouse 111 of FIG. 1, a keyboard, such as keyboard 107 of FIG. 1, a touchpad, a voice recognition system, or any other device and/or process for converting user actions into computer readable instructions/commands.

Returning to FIG. 2, in one embodiment, once the user activates the scrolling symbol, the list of data entries of DISPLAY THE DATA TABLE IN A DATA TABLE USER INTERFACE DISPLAY OPERATION 205 is scrolled through until the scrolling symbol is deactivated.

FIG. 3 shows a scrolling symbol 303 that is being activated by a cursor (not shown) that, in turn, is manipulated by a mouse (not shown) by a user. In this specific example, scrolling symbol 303 is a scrolling "thumb" that, when activated, scrolls through the data entries of data table 301 until released, i.e., deactivated, by the user by releasing a mouse button.

Also shown in FIG. 3 is traditional scroll position symbol 304 that gives a rough visual indication of the position of the scroll, but, in the prior art, gave no indication of the specific data entry being scrolled through at any given time, or any data associated with the specific data entry being scrolled through at any given time.

In one embodiment, once a scrolling display, icon, symbol, or similar function, that is capable of being activated by the user is provided at DISPLAY A SCROLLING SYMBOL FOR ACTIVATING THE SCROLLING CAPABILITY IN THE DATA TABLE USER INTERFACE DISPLAY OPERATION 209, process flow proceeds to SELECT AT LEAST ONE DATA FIELD OF THE ONE OR MORE DATA FIELDS ASSOCIATED WITH EACH DATA ENTRY AS A DATA DISPLAY FIELD OPERATION 211.

In one embodiment, at SELECT AT LEAST ONE DATA FIELD OF THE ONE OR MORE DATA FIELDS ASSOCIATED WITH EACH DATA ENTRY AS A DATA DISPLAY FIELD OPERATION 211 at least one data field of the one or more data fields associated with the data entries in the data table of ORGANIZE DATA INTO A DATA TABLE OF DATA ENTRIES WITH EACH DATA ENTRY INCLUDING ONE OR MORE DATA FIELDS OPERATION 203 is selected as a "data display field".

In various embodiments, the data display field is selected manually by the user at SELECT AT LEAST ONE DATA FIELD OF THE ONE OR MORE DATA FIELDS ASSOCIATED WITH EACH DATA ENTRY AS A DATA DISPLAY FIELD OPERATION 211 via a user interface device such as, but not limited to, a mouse, such as mouse 111 of FIG. 1, a keyboard, such as keyboard 107 of FIG. 1, a touchpad, a voice recognition system, or any other device and/or process for converting user actions into computer readable instructions/commands.

Returning to FIG. 2, in various embodiments, at SELECT AT LEAST ONE DATA FIELD OF THE ONE OR MORE DATA FIELDS ASSOCIATED WITH EACH DATA ENTRY AS A DATA DISPLAY FIELD OPERATION 211 the data display field is selected automatically by process for providing an intelligent visual data scrollbar position indicator 200 based on the data management system, such as computing system generated data management system 183 and/or online data management system 187 of FIG. 1, generating the data table being viewed.

In various embodiments, at SELECT AT LEAST ONE DATA FIELD OF THE ONE OR MORE DATA FIELDS ASSOCIATED WITH EACH DATA ENTRY AS A DATA DISPLAY FIELD OPERATION 211 the data display field is selected semi-automatically by process for providing an intelligent visual data scrollbar position indicator 200 based on the data management system generating the data table being viewed and subject to user input, review, and/or approval.

In various embodiments, at SELECT AT LEAST ONE DATA FIELD OF THE ONE OR MORE DATA FIELDS ASSOCIATED WITH EACH DATA ENTRY AS A DATA DISPLAY FIELD OPERATION 211 the data display field is selected automatically by a data management system, and/or process for providing an intelligent visual data scrollbar position indicator 200, based on the previous data display field selections made by the user.

In various embodiments, at SELECT AT LEAST ONE DATA FIELD OF THE ONE OR MORE DATA FIELDS ASSOCIATED WITH EACH DATA ENTRY AS A DATA DISPLAY FIELD OPERATION 211 the data display field is selected semi-automatically by a data management system, and/or process for providing an intelligent visual data scrollbar position indicator 200, based on the previous data display field selections made by the user and subject to user input, review, and/or approval.

In various embodiments, at SELECT AT LEAST ONE DATA FIELD OF THE ONE OR MORE DATA FIELDS ASSOCIATED WITH EACH DATA ENTRY AS A DATA DISPLAY FIELD OPERATION 211 the data display field is selected automatically by a data management system, and/or process for providing an intelligent visual data scrollbar position indicator 200, based on the type of data table being viewed.

In various embodiments, at SELECT AT LEAST ONE DATA FIELD OF THE ONE OR MORE DATA FIELDS ASSOCIATED WITH EACH DATA ENTRY AS A DATA DISPLAY FIELD OPERATION 211 the data display field is selected semi-automatically by a data management system, and/or process for providing an intelligent visual data scrollbar position indicator 200, based on the type of data table being viewed and subject to user input, review, and/or approval.

In various embodiments, at SELECT AT LEAST ONE DATA FIELD OF THE ONE OR MORE DATA FIELDS ASSOCIATED WITH EACH DATA ENTRY AS A DATA DISPLAY FIELD OPERATION 211 the data display field is selected automatically by a data management system, and/or process for providing an intelligent visual data scrollbar position indicator 200, based on any analysis by process for providing an intelligent visual data scrollbar position indicator 200 such as what type of data is being viewed, other historical actions taken by the user, and/or one or more other selection parameters.

In various embodiments, at SELECT AT LEAST ONE DATA FIELD OF THE ONE OR MORE DATA FIELDS ASSOCIATED WITH EACH DATA ENTRY AS A DATA DISPLAY FIELD OPERATION 211 the data display field is selected by any means, mechanism, process, procedure, or combination of means, mechanisms, processes, procedures, as discussed herein, and/or as known in the art at the time of filing, and/or as developed after the time of filing.

In one embodiment, at SELECT AT LEAST ONE DATA FIELD OF THE ONE OR MORE DATA FIELDS ASSOCIATED WITH EACH DATA ENTRY AS A DATA DISPLAY FIELD OPERATION 211 the data indicating the selected data display field for the displayed data table is stored and/or associated with the displayed data table.

In one embodiment, at SELECT AT LEAST ONE DATA FIELD OF THE ONE OR MORE DATA FIELDS ASSOCIATED WITH EACH DATA ENTRY AS A DATA DISPLAY FIELD OPERATION 211 the data indicating the selected data display field for the displayed data table is stored in a memory system, or database, or in a cache memory, or in any main memory or mass memory, associated with any computing system as discussed herein, and/or as known in the art at the time of filing, and/or as developed after the time of filing.

In various embodiments, at SELECT AT LEAST ONE DATA FIELD OF THE ONE OR MORE DATA FIELDS ASSOCIATED WITH EACH DATA ENTRY AS A DATA DISPLAY FIELD OPERATION 211 the data indicating the selected data display field for the displayed data table, in whole, or in part, is stored in any computing system, such as user computing system 100 and/or server system, such as server system 120 of FIG. 1, and/or a database, such as database 170 of FIG. 1, or any other device, in another location, or on/in a computer readable medium, and/or any other computer program product, as defined herein.

Returning to FIG. 2, in various embodiments, at SELECT AT LEAST ONE DATA FIELD OF THE ONE OR MORE DATA FIELDS ASSOCIATED WITH EACH DATA ENTRY AS A DATA DISPLAY FIELD OPERATION 211 the data indicating the selected data display field for the displayed data table, in whole, or in part, is stored on a webpage, in a web-based system or on a public network such as the Internet.

Returning to FIG. 3, as noted above, in this specific example, the data entries of data table 301 are sorted by payee, alphabetically. In addition, in this specific example the payee data field 305, or data "column", is selected as the data display field.

In one embodiment, once at least one data field of the one or more data fields associated with the data entries in the data table of ORGANIZE DATA INTO A DATA TABLE OF DATA ENTRIES WITH EACH DATA ENTRY INCLUDING ONE OR MORE DATA FIELDS OPERATION 203 is selected as a "data display field" at SELECT AT LEAST ONE DATA FIELD OF THE ONE OR MORE DATA FIELDS ASSOCIATED WITH EACH DATA ENTRY AS A DATA DISPLAY FIELD OPERATION 211 process flow proceeds to DETERMINE WHAT PORTION OF DATA IN THE SELECTED DATA DISPLAY FIELD IS TO BE USED AS DISPLAY DATA BASED, AT LEAST IN PART, ON THE DATA DISPLAY FIELD SELECTED AND/OR THE RATE OF CHANGE OF THE DATA IN THE DATA DISPLAY FIELD SELECTED OPERATION 213.

In one embodiment, at DETERMINE WHAT PORTION OF DATA IN THE SELECTED DATA DISPLAY FIELD IS TO BE USED AS DISPLAY DATA BASED, AT LEAST IN PART, ON THE DATA DISPLAY FIELD SELECTED AND/OR THE RATE OF CHANGE OF THE DATA IN THE DATA DISPLAY FIELD SELECTED OPERATION 213 a portion of the data in the selected data display field of SELECT AT LEAST ONE DATA FIELD OF THE ONE OR MORE DATA FIELDS ASSOCIATED WITH EACH DATA ENTRY AS A DATA DISPLAY FIELD OPERATION 211 is selected as "display data" based, at least in part, on the data display field selected at SELECT AT LEAST ONE DATA FIELD OF THE ONE OR MORE DATA FIELDS ASSOCIATED WITH EACH DATA ENTRY AS A DATA DISPLAY FIELD OPERATION 211 and the rate of change of the data in the selected data display field.

In various embodiments, at DETERMINE WHAT PORTION OF DATA IN THE SELECTED DATA DISPLAY FIELD IS TO BE USED AS DISPLAY DATA BASED, AT LEAST IN PART, ON THE DATA DISPLAY FIELD SELECTED AND/OR THE RATE OF CHANGE OF THE DATA IN THE DATA DISPLAY FIELD SELECTED OPERATION 213 the determination of size, or amount, of display data, and/or the display data display style, is made based, at least in part, on the data display field selected and/or the rate of change of the data in the selected data display field.

In various embodiments, the size, or amount, of display data, and/or the display data display style, can be, but is not limited to: a defied alpha-numeric character, such as a first letter or month number or day number; a defied number of alpha-numeric characters, such as a first two or more letters or a date format such as DD/MM; a defied word or group of alpha-numeric characters, such as a first entire word or entire date, such as DD/MM/YYYY; all the data in the data display field; all, or part of, the data in multiple data display fields; or any display data style desired by the user and/or the provider of process for providing an intelligent visual data scrollbar position indicator 200 as discussed herein, and/or as known in the art at the time of filing, and/or as developed after the time of filing.

In various embodiments, at DETERMINE WHAT PORTION OF DATA IN THE SELECTED DATA DISPLAY FIELD IS TO BE USED AS DISPLAY DATA BASED, AT LEAST IN PART, ON THE DATA DISPLAY FIELD SELECTED AND/OR THE RATE OF CHANGE OF THE DATA IN THE DATA DISPLAY FIELD SELECTED OPERATION 213 the determination of the size, or amount, and/or the display data display style, is made based, at least in part, on the data display field selected and/or the rate of change of the data in the selected data display field such that the amount of display data, or style of display data display, corresponds, directly or indirectly, to the expected rate of change, or calculated rate of change, associated with the data in the selected data display field. In this way, the rate of change of the display data seen by the user is adjusted to enable the user to more clearly discern, and/or absorb, the display data.

In one embodiment, at DETERMINE WHAT PORTION OF DATA IN THE SELECTED DATA DISPLAY FIELD IS TO BE USED AS DISPLAY DATA BASED, AT LEAST IN PART, ON THE DATA DISPLAY FIELD SELECTED AND/ OR THE RATE OF CHANGE OF THE DATA IN THE DATA DISPLAY FIELD SELECTED OPERATION 213 the determination of the size, or amount, of display data, and/or the display data display style, is made based on the selected data display field and known or average rates of data change associated with the data in the selected data display field.

In this embodiment, the average rate of change for various data display field types is calculated, and/or estimated, and then data indicating the expected rate of change for each data display field type is associated with the respective data display field type and stored. As an example, the data display field "payee", such as payee filed 305 of FIG. 3, might be expected to have rapidly changing data while the data display field "date" for a weekly payments report for a large company would be expected to have slowly changing data since only seven dates, at most, would be involved.

For instance, in one embodiment, if the rate of data change associated with a selected data display field were known to, on average, be high, i.e., the data in the selected data display field is expected to change quickly as the data entries are scrolled, then at DETERMINE WHAT PORTION OF DATA IN THE SELECTED DATA DISPLAY FIELD IS TO BE USED AS DISPLAY DATA BASED, AT LEAST IN PART, ON THE DATA DISPLAY FIELD SELECTED AND/OR THE RATE OF CHANGE OF THE DATA IN THE DATA DISPLAY FIELD SELECTED OPERATION 213, the size, or amount, of display data, and/or the display data display style, would be chosen to be minimal, such as a first letter or character of the data, so that the rate of change of the display data would be low enough for the user to read, and/or absorb, what was being displayed by the display data.

On the other hand, if the rate of data change associated with a selected data display field were known to, on average, be low, i.e., the data in the selected data display field is expected to change slowly as the data entries are scrolled, then at DETERMINE WHAT PORTION OF DATA IN THE SELECTED DATA DISPLAY FIELD IS TO BE USED AS DISPLAY DATA BASED, AT LEAST IN PART, ON THE DATA DISPLAY FIELD SELECTED AND/OR THE RATE OF CHANGE OF THE DATA IN THE DATA DISPLAY FIELD SELECTED OPERATION 213, the size, or amount, of display data, and/or the display data display style, would be chosen to be larger, such as full words or even the entire amount of data in the selected data display field, in order to provide the user more detailed display data.

In once embodiment, once the data display field is selected at SELECT AT LEAST ONE DATA FIELD OF THE ONE OR MORE DATA FIELDS ASSOCIATED WITH EACH DATA ENTRY AS A DATA DISPLAY FIELD OPERATION 211, the user's actual data in the data display field of all the data entries in the data table is analyzed to determine an actual rate of change of the user's actual data in the selected data display field. Then, in one embodiment, at DETERMINE WHAT PORTION OF DATA IN THE SELECTED DATA DISPLAY FIELD IS TO BE USED AS DISPLAY DATA BASED, AT LEAST IN PART, ON THE DATA DISPLAY FIELD SELECTED AND/OR THE RATE OF CHANGE OF THE DATA IN THE DATA DISPLAY FIELD SELECTED OPERATION 213 the determination of the size, or amount of display data, and/or the display data display style, is made based on the selected data display field and this determined actual rate of change of the user's actual data in the selected data display field.

For instance, if the determined actual rate of change associated with a selected data display field were calculated to be high, i.e., the data in the selected data display field is determined to change quickly as the data entries are scrolled, then at DETERMINE WHAT PORTION OF DATA IN THE SELECTED DATA DISPLAY FIELD IS TO BE USED AS DISPLAY DATA BASED, AT LEAST IN PART, ON THE DATA DISPLAY FIELD SELECTED AND/OR THE RATE OF CHANGE OF THE DATA IN THE DATA DISPLAY FIELD SELECTED OPERATION 213 the size, or amount, of display data would be chosen to be minimal, such as a first letter or character of the data, so that the rate of change of the display data would be low enough for the user to read, and/or absorb, what was being displayed by the display data.

On the other hand, if the determined actual rate of change associated with a selected data display field were calculated to be low, i.e., the data in the selected data display field is determined to change slowly as the data entries are scrolled, then at DETERMINE WHAT PORTION OF DATA IN THE SELECTED DATA DISPLAY FIELD IS TO BE USED AS DISPLAY DATA BASED, AT LEAST IN PART, ON THE DATA DISPLAY FIELD SELECTED AND/OR THE RATE OF CHANGE OF THE DATA IN THE DATA DISPLAY FIELD SELECTED OPERATION 213 the size, or amount, of display data would be chosen to be larger, such as full words or even the entire amount of data in the selected data display field, in order to provide the user more detailed display data.

In one embodiment, at DETERMINE WHAT PORTION OF DATA IN THE SELECTED DATA DISPLAY FIELD IS TO BE USED AS DISPLAY DATA BASED, AT LEAST IN PART, ON THE DATA DISPLAY FIELD SELECTED AND/OR THE RATE OF CHANGE OF THE DATA IN THE DATA DISPLAY FIELD SELECTED OPERATION 213 the rate at which a user is scrolling through a data table is monitored and the determination of the size, or amount, of display data, and/or the display data display style, is made based on the scroll rate used by the user to scroll through the data entries in the data table.

For instance, if the scroll rate is determined to be high, i.e., the user is scrolling the data table quickly, then at DETERMINE WHAT PORTION OF DATA IN THE SELECTED DATA DISPLAY FIELD IS TO BE USED AS DISPLAY DATA BASED, AT LEAST IN PART, ON THE DATA DISPLAY FIELD SELECTED AND/OR THE RATE OF CHANGE OF THE DATA IN THE DATA DISPLAY FIELD SELECTED OPERATION 213 the size, or amount, of display data, and/or the display data display style, would be chosen to be minimal, such as a first letter or character of the data, so that the rate of change of the display data would be low enough for the user to read, and/or absorb, what was being displayed by the display data.

On the other hand, if the scroll rate is determined to be low, i.e., the user is scrolling the data table slowly, then at DETERMINE WHAT PORTION OF DATA IN THE SELECTED DATA DISPLAY FIELD IS TO BE USED AS DISPLAY DATA BASED, AT LEAST IN PART, ON THE DATA DISPLAY FIELD SELECTED AND/OR THE RATE OF CHANGE OF THE DATA IN THE DATA DISPLAY FIELD SELECTED OPERATION 213 the size, or amount, of display data, and/or the display data display style, would be chosen to be larger, such as full words or even the entire amount of data in the selected data display field, in order to provide the user more detailed data.

In one embodiment, and for one implementation, at DETERMINE WHAT PORTION OF DATA IN THE SELECTED DATA DISPLAY FIELD IS TO BE USED AS DISPLAY DATA BASED, AT LEAST IN PART, ON THE DATA DISPLAY FIELD SELECTED AND/OR THE RATE OF CHANGE OF THE DATA IN THE DATA DISPLAY FIELD SELECTED OPERATION 213 the scrolling capability, such as the scrollbar, sends a message to a scrolling capability delegate when the scrolling event starts, i.e., when the scrolling symbol is activated, to acquire information about the current data display field. The scrolling capability will then automatically observe a given target/keypath for data changes, and will update accordingly. In this way, the "client" of the class is really only responsible for keeping a single property correctly populated with the "current scrolled value", and the class handles the rest.

In other embodiments, for more complicated scenarios, the class supports a full range of status notifications and even supports polling should that be required. In its simplest manifestation, however, it can be implemented in as few as a dozen or so lines of code.

In one embodiment, once a portion of the data in the selected data display field of SELECT AT LEAST ONE DATA FIELD OF THE ONE OR MORE DATA FIELDS ASSOCIATED WITH EACH DATA ENTRY AS A DATA DISPLAY FIELD OPERATION 211 is selected as "display data" based, at least in part, on the data display field selected at SELECT AT LEAST ONE DATA FIELD OF THE ONE OR MORE DATA FIELDS ASSOCIATED WITH EACH DATA ENTRY AS A DATA DISPLAY FIELD OPERATION 211 and the rate of change of the data in the selected data display field at DETERMINE WHAT PORTION OF DATA IN THE SELECTED DATA DISPLAY FIELD IS TO BE USED AS DISPLAY DATA BASED, AT LEAST IN PART, ON THE DATA DISPLAY FIELD SELECTED AND/OR THE RATE OF CHANGE OF THE DATA IN THE DATA DISPLAY FIELD SELECTED OPERATION 213 process flow proceeds to ACTIVATE THE SCROLLING CAPABILITY FOR SCROLLING THROUGH THE DATA TABLE OPERATION 215.

In one embodiment, at ACTIVATE THE SCROLLING CAPABILITY FOR SCROLLING THROUGH THE DATA TABLE OPERATION 215 the user activates the scrolling capability of DISPLAY A SCROLLING SYMBOL FOR ACTIVATING THE SCROLLING CAPABILITY IN THE DATA TABLE USER INTERFACE DISPLAY OPERATION 209.

As noted above, in one embodiment, at ACTIVATE THE SCROLLING CAPABILITY FOR SCROLLING THROUGH THE DATA TABLE OPERATION 215 the user activates the scrolling capability of DISPLAY A SCROLLING SYMBOL FOR ACTIVATING THE SCROLLING CAPABILITY IN THE DATA TABLE USER INTERFACE DISPLAY OPERATION 209 by activating a scrolling display, icon, symbol, or similar function, via a user interface device such as, but not limited to, a mouse, such as mouse 111 of FIG. 1, a keyboard, such as keyboard 107 of FIG. 1, a touchpad, a voice recognition system, or any other device and/or process for converting user actions into computer readable instructions/commands.

Returning to FIG. 2, as also noted above, in one embodiment, once the user activates the scrolling symbol, the list of data entries of DISPLAY THE DATA TABLE IN A DATA TABLE USER INTERFACE DISPLAY OPERATION 205 is scrolled through until the scrolling symbol is deactivated.

Returning to FIG. 3, recall FIG. 3 shows a scrolling symbol 303 that is being activated by a cursor (not shown) that, in turn, is manipulated by a mouse (not shown) by a user. In this specific example, scrolling symbol 303 is a scrolling "thumb" that, when activated, scrolls through the data entries of data table 301 until released, i.e., deactivated, by the user by releasing a mouse button.

As also discussed above, shown in FIG. 3 is traditional scroll position symbol 304 that gives a rough visual indication of the position of the scroll, but, in the prior art, gave no indication of the specific data entry being scrolled through at any given time, or any data associated with the specific data entry being scrolled through at any given time.

Returning to FIG. 2, in one embodiment, once the user activates the scrolling capability of DISPLAY A SCROLLING SYMBOL FOR ACTIVATING THE SCROLLING CAPABILITY IN THE DATA TABLE USER INTERFACE DISPLAY OPERATION 209 at ACTIVATE THE SCROLLING CAPABILITY FOR SCROLLING THROUGH THE DATA TABLE OPERATION 215, process flow proceeds to WHILE THE SCROLLING CAPABILITY IS ACTIVATED, AS EACH DATA ENTRY IS SCROLLED THROUGH, DISPLAY THE DISPLAY DATA OF THE SELECTED DISPLAY FIELD ASSOCIATED WITH EACH DATA ENTRY ON THE DATA TABLE USER INTERFACE DISPLAY OPERATION 217.

In one embodiment, at WHILE THE SCROLLING CAPABILITY IS ACTIVATED, AS EACH DATA ENTRY IS SCROLLED THROUGH, DISPLAY THE DISPLAY DATA OF THE SELECTED DISPLAY FIELD ASSOCIATED WITH EACH DATA ENTRY ON THE DATA TABLE USER INTERFACE DISPLAY OPERATION 217 as the table of data entries of DISPLAY THE DATA TABLE IN A DATA TABLE USER INTERFACE DISPLAY OPERATION 205 is being scrolled through, the display data of DETERMINE WHAT PORTION OF DATA IN THE SELECTED DATA DISPLAY FIELD IS TO BE USED AS DISPLAY DATA BASED, AT LEAST IN PART, ON THE DATA DISPLAY FIELD SELECTED AND/OR THE RATE OF CHANGE OF THE DATA IN THE DATA DISPLAY FIELD SELECTED OPERATION 213, associated with each data entry in the data table is displayed to the user as each data entry is scrolled through, and as the scrolling is in progress, i.e., while the scrolling function is still activated at ACTIVATE THE SCROLLING CAPABILITY FOR SCROLLING THROUGH THE DATA TABLE OPERATION 215.

In one embodiment, once the user activates the scrolling symbol at ACTIVATE THE SCROLLING CAPABILITY FOR SCROLLING THROUGH THE DATA TABLE OPERATION 215, the data table is scrolled through and as the data table is being scrolled through, at WHILE THE SCROLLING CAPABILITY IS ACTIVATED, AS EACH DATA ENTRY IS SCROLLED THROUGH, DISPLAY THE DISPLAY DATA OF THE SELECTED DISPLAY FIELD ASSOCIATED WITH EACH DATA ENTRY ON THE DATA TABLE USER INTERFACE DISPLAY OPERATION 217, the display data associated with each entry in the data table of SELECT AT LEAST ONE DATA FIELD OF THE ONE OR MORE DATA FIELDS ASSOCIATED WITH EACH DATA ENTRY AS A DATA DISPLAY FIELD OPERATION 211 is displayed to the user as each data entry is passed, i.e., as each data entry is scrolled through, and as the scrolling is in progress, while the scrolling function is still activated.

In one embodiment, at WHILE THE SCROLLING CAPABILITY IS ACTIVATED, AS EACH DATA ENTRY IS SCROLLED THROUGH, DISPLAY THE DISPLAY DATA OF THE SELECTED DISPLAY FIELD ASSOCIATED WITH EACH DATA ENTRY ON THE DATA TABLE USER INTERFACE DISPLAY OPERATION 217, the display data of the selected data display field associated with each entry in the data table is displayed as a semi-transparent, or semi-translucent, "Heads Up Display" (HUD) in the same data table user interface display as the data entries and data table.

In one embodiment, at WHILE THE SCROLLING CAPABILITY IS ACTIVATED, AS EACH DATA ENTRY IS SCROLLED THROUGH, DISPLAY THE DISPLAY DATA OF THE SELECTED DISPLAY FIELD ASSOCIATED WITH EACH DATA ENTRY ON THE DATA TABLE USER INTERFACE DISPLAY OPERATION 217, the display data of the selected data display field associated with each entry in the data table is displayed as text in a text window or other display associated with the scrolling symbol and displayed on the same display screen as the data table and the scrolling symbol.

In one embodiment, at WHILE THE SCROLLING CAPABILITY IS ACTIVATED, AS EACH DATA ENTRY IS SCROLLED THROUGH, DISPLAY THE DISPLAY DATA OF THE SELECTED DISPLAY FIELD ASSOCIATED WITH EACH DATA ENTRY ON THE DATA TABLE USER INTERFACE DISPLAY OPERATION 217, the display data of the selected data display field associated with each entry in the data table is displayed as a replacement symbol for the scrolling symbol.

In one embodiment, at WHILE THE SCROLLING CAPABILITY IS ACTIVATED, AS EACH DATA ENTRY IS SCROLLED THROUGH, DISPLAY THE DISPLAY DATA OF THE SELECTED DISPLAY FIELD ASSOCIATED WITH EACH DATA ENTRY ON THE DATA TABLE USER INTERFACE DISPLAY OPERATION 217, the display data of the selected data display field associated with each entry in the data table in a separate section or window of the display screen that includes the data table and the scrolling symbol.

As noted above, in one embodiment, at WHILE THE SCROLLING CAPABILITY IS ACTIVATED, AS EACH DATA ENTRY IS SCROLLED THROUGH, DISPLAY THE DISPLAY DATA OF THE SELECTED DISPLAY FIELD ASSOCIATED WITH EACH DATA ENTRY ON THE DATA TABLE USER INTERFACE DISPLAY OPERATION 217, the display data of the selected data display field associated with each entry in the data table is displayed as a semi-transparent, or semi-translucent, "Heads Up Display" (HUD) in the same data table user interface display as the data entries and data table.

Returning to FIG. 3, data table user interface display 300 included display data display 307. In this specific example, it is assumed that at DETERMINE WHAT PORTION OF DATA IN THE SELECTED DATA DISPLAY FIELD IS TO BE USED AS DISPLAY DATA BASED, AT LEAST IN PART, ON THE DATA DISPLAY FIELD SELECTED AND/OR THE RATE OF CHANGE OF THE DATA IN THE DATA DISPLAY FIELD SELECTED OPERATION 213 (FIG. 2) it was either estimated, or determined/calculated, that the data in the data field payee 305 (FIG. 3) selected as the data display field at SELECT AT LEAST ONE DATA FIELD OF THE ONE OR MORE DATA FIELDS ASSOCIATED WITH EACH DATA ENTRY AS A DATA DISPLAY FIELD OPERATION 211 (FIG. 2) changes rapidly, or the user is scrolling rapidly. Consequently, at DETERMINE WHAT PORTION OF DATA IN THE SELECTED DATA DISPLAY FIELD IS TO BE USED AS DISPLAY DATA BASED, AT LEAST IN PART, ON THE DATA DISPLAY FIELD SELECTED AND/OR THE RATE OF CHANGE OF THE DATA IN THE DATA DISPLAY FIELD SELECTED OPERATION 213 (FIG. 2) the size, or amount, of display data, i.e., the style of display data display 307 was chosen to be minimal, in this case the first letter of the payee name data, so that the rate of change of the display data would be low enough for the user to read, and/or absorb, what was being displayed by the display data.

On the other hand, if, as another example (not shown) at DETERMINE WHAT PORTION OF DATA IN THE SELECTED DATA DISPLAY FIELD IS TO BE USED AS DISPLAY DATA BASED, AT LEAST IN PART, ON THE DATA DISPLAY FIELD SELECTED AND/OR THE RATE OF CHANGE OF THE DATA IN THE DATA DISPLAY FIELD SELECTED OPERATION 213 (FIG. 2) it was either estimated, or determined/calculated, that the data in the data field payee 305 (FIG. 3) selected as the data display field at SELECT AT LEAST ONE DATA FIELD OF THE ONE OR MORE DATA FIELDS ASSOCIATED WITH EACH DATA ENTRY AS A DATA DISPLAY FIELD OPERATION 211 (FIG. 2) changes slowly, or the user is scrolling slowly, then at DETERMINE WHAT PORTION OF DATA IN THE SELECTED DATA DISPLAY FIELD IS TO BE USED AS DISPLAY DATA BASED, AT LEAST IN PART, ON THE DATA DISPLAY FIELD SELECTED AND/OR THE RATE OF CHANGE OF THE DATA IN THE DATA DISPLAY FIELD SELECTED OPERATION 213 (FIG. 2) the size, or amount, of display data, i.e., the style of display data display 307, would be chosen to include more data (not shown), such as first word of the payee name data, for instance "Frys" (not shown), so that the rate of change of the display data would be low enough for the user to read, and/or absorb, what was being displayed by the display data.

As one illustrative example, of one implementation, in one embodiment, the architecture used to implement one embodiment of process for providing an intelligent visual data scrollbar position indicator 200 involves the following instructions description:

In this specific example of one embodiment, activation of an optionsForScrollingHelperHUDController returns a dictionary of setup options.

In this specific example of one embodiment, the options dictionary contains the following keys:
observationTarget <required> (id)
observationKeypath <required> (NSString *)
scrollingHelperHUDStyle <required> (NSNumber *)
xOffset <optional> (NSNumber *)—# of pixels to offset the helper from center (X axis)
yOffset <optional> (NSNumber *)—# of pixels to offset the helper from center (Y axis, lower left origin)

In this specific example of one embodiment, display data display styles in this example include:
ScrollingHelperHUDStyle_Letter—A square window containing a very short string (typically a single letter).
ScrollingHelperHUDStyle_OneLine—A rectangular window containing a single string.
ScrollingHelperHUDStyle_TwoLine—A rectangular window containing two strings (one larger than the other).

In this specific example of one embodiment, the observationTarget and observationKeypath are the target and keypath that the HUD controller should observe to get the object value for the HUD. In this specific example of one embodiment, the HUD will update automatically each time this value is changed in a KVO-compliant manner.

In this specific example of one embodiment, the object type for each of the currently supported styles:
ScrollingHelperHUDStyle_Letter—NSString *
ScrollingHelperHUDStyle_OneLine—NSString *
ScrollingHelperHUDStyle_TwoLine—NSArray of NSStrings In some embodiments of this illustrative example, the following options are provided:
Status Reporting:
scrollingHelperHUDControllerWillBegin: called after the controller and HUD window are instantiated, but before content is observed or the HUD is displayed.
scrollingHelperHUDControllerDidBegin: called immediately after the HUD is displayed.
scrollingHelperHUDControllerWillFinish: called immediately after the user releases the mouse but before the HUD is removed.
scrollingHelperHUDControllerDidFinish: called after the HUD is removed.

Content Polling: In this specific example of one embodiment, the HUD controller is already observing the given target and keypath for changes, so polling is never required. However, if the client isn't tracking its own scrolling and needs to be told that a new value is required, implement this method.
scrollingHelperHUDControllerRequestsUpdate: called each time the controller detects that the bounds of the clipView enclosing the documentView have changed (this usually implies scrolling). The client can respond in any way it sees fit, and if the scroll helper value should change, it should update the observed value in a KVO compliant manner.

While in the discussion above the term KVO or "Key Value Code" was used for illustrative purposes associated with this one illustrative example, those of skill in the art will recognize that any means, mechanism, process, and/or procedure for observing, or being notified of, changes to a given value could be used in place of, or in addition to, the KVO. Consequently, in various embodiments, any means, mechanism, process, and/or procedure, as discussed herein, and/or as known in the art at the time of filing, and/or as developed after the time of filing, by which the scrolling mechanism can observe, or be made aware of, data changes can be used and/or implemented.

The above illustrative example, of one implementation, in one embodiment, of an architecture used to implement one embodiment of process for providing an intelligent visual data scrollbar position indicator 200 is both flexible and quick/easy to use. Yet, while it is extremely flexible (when necessary), it also can be set up and used very quickly by implementing one callback. While the class supports polling, the simpler and more common usage involves simple observation of a target/keypath that contains the current scrolled value. If the value at this keypath is changed in a key-value-observing compliant way, the scrolling HUD automatically updates. If the table or other UI element being scrolled is not directly in control of its own scrolling, the helper class also supports polling—it will automatically detect when the content appears to have scrolled, and will poll the delegate for a new value.

Those of skill in the art will recognize that the description above of one illustrative example, of one implementation, in accordance with once embodiment, is wholly illustrative, and provided for illusive purposes only, and does not limit the scope of the claims as set forth below.

Returning to FIG. 2, in one embodiment, once as the table of data entries of DISPLAY THE DATA TABLE IN A DATA TABLE USER INTERFACE DISPLAY OPERATION 205 is being scrolled through, the display data of DETERMINE WHAT PORTION OF DATA IN THE SELECTED DATA DISPLAY FIELD IS TO BE USED AS DISPLAY DATA BASED, AT LEAST IN PART, ON THE DATA DISPLAY FIELD SELECTED AND/OR THE RATE OF CHANGE OF THE DATA IN THE DATA DISPLAY FIELD SELECTED OPERATION 213, associated with each data entry in the data table is displayed to the user as each data entry is scrolled through, and as the scrolling is in progress, i.e., while the scrolling function is still activated at ACTIVATE THE SCROLLING CAPABILITY FOR SCROLLING THROUGH THE DATA TABLE OPERATION 215 at WHILE THE SCROLLING CAPABILITY IS ACTIVATED, AS EACH DATA ENTRY IS SCROLLED THROUGH, DISPLAY THE DISPLAY DATA OF THE SELECTED DISPLAY FIELD ASSOCIATED WITH EACH DATA ENTRY ON THE DATA TABLE USER INTERFACE DISPLAY OPERATION 217 process flow proceeds to EXIT OPERATION 230.

In one embodiment, at EXIT OPERATION 230, process for providing an intelligent visual data scrollbar position indicator 200 is exited to await a scroll activation.

Using process for providing an intelligent visual data scrollbar position indicator 200, the amount of display data shown to a user is variable and is determined by the data display field selected, and/or the "velocity" at which the data in the selected data display field changes. Consequently, the velocity, or rate of change, of the display data seen by the user is adjusted to enable the user to clearly discern, and/or absorb, the display data. Therefore, using process for providing an intelligent visual data scrollbar position indicator 200, it is more likely the user will be able to find the desired data entry quickly, and on a first stop, and less likely the user will have to stop the scroll, note where in the data table the scroll is positioned, and then begin the scroll again to get closer to a desired data entry.

As discussed in more detail above, using the above embodiments, with little or no modification and/or consumer input, there is considerable flexibility, adaptability, and opportunity for customization to meet the specific needs of various consumers under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "organizing", "displaying", "activating", "selecting", "obtaining", "intercepting", "accessing", "scanning", "transforming", "linking", "verifying", "monitoring", "browsing", "updating", "associating", "analyzing", "defining", "storing", "saving", "displaying", "implementing", "performing", "creating", "assigning", "estimating", "entering", "modifying", "categorizing", "providing", "processing", "accessing", "selecting", "scheduling", "creating", "using", "comparing", "submitting", "generating", etc., refer to the action and process of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic or algorithmic-like form. It should be noted that the process steps or operations and instructions of the present invention can be embodied in software, firmware, or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for providing an intelligent visual data scrollbar position indicator comprising the following, which when executed individually or collectively by any set of one or more processors perform a process comprising:
   organizing data into two or more data entries with each data entry including one or more data fields containing information and then listing the two or more data entries in a data table;
   displaying the data table in a data table user interface display displayed on a display device associated with a computing system;
   providing a scrolling capability whereby a user can scroll through the data table displayed in the data table user interface display;
   displaying a scrolling symbol for activation of the scrolling capability, the scrolling symbol being displayed in the data table user interface display;
   selecting at least one of the one or more data fields containing information of the two or more data entries as a data display field;
   activating via user input the scrolling capability via the scrolling symbol;
   determining, while the scrolling capability is activated and information is changing in the display field, how many characters of the information in the data display field will be used as display data based, at least in part, on the data display field selected and the rate of change of information in the selected data display field; and
   while the scrolling capability is activated, displaying in the data table user interface display, the display data associated with each data entry in the data table as each data entry in the data table is scrolled through and the scroll is positioned on the data entry.

2. The computing system implemented method for providing an intelligent visual data scrollbar position indicator of claim 1, wherein;
   the data display field is selected based on historical data display field selections by the user for the type of data table.

3. The computing system implemented method for providing an intelligent visual data scrollbar position indicator of claim 1 wherein;
   the rate of change of the information in the data display field is determined, at least in part, by pre-estimating the rate of change of information in the type of data display selected using data indicating the average rate of change of information in the type of data display field selected.

4. A computing system implemented method for providing an intelligent visual data scrollbar position indicator comprising the following, which when executed individually or collectively by any set of one or more processors perform a process comprising:
   organizing data into two or more data entries with each data entry including one or more data fields containing information and then listing the two or more data entries in a data table;
   displaying the data table in a data table user interface display displayed on a display device associated with a computing system;
   providing a scrolling capability whereby a user can scroll through the data table displayed in the data table user interface display;
   displaying a scrolling symbol for activation of the scrolling capability, the scrolling symbol being displayed in the data table user interface display;
   selecting at least one of the one or more data fields containing information of the two or more data entries as a data display field;
   analyzing the actual user's information in the data display field selected to determine a rate of change of the actual user's information in the data display field selected;
   activating via user input the scrolling capability via the scrolling symbol;
   determining, while the scrolling capability is activated and information is changing in the display field, how many characters of the information in the data display field will be used as display data based, at least in part, on the data display field selected and the rate of change of information in the selected data display field; and while the scrolling capability is activated, displaying in the data table user interface display, the display data associated with each data entry in the data table as each data entry in the data table is scrolled through and the scroll is positioned on the data entry.

5. The computing system implemented method for providing an intelligent visual data scrollbar position indicator of claim 4, wherein;

the data display field is selected based on historical data display field selections by the user for the type of data table.

6. A computing system implemented method for providing an intelligent visual data scrollbar position indicator comprising the following, which when executed individually or collectively by any set of one or more processors perform a process comprising:

organizing data into two or more data entries with each data entry including one or more data fields containing information and then listing the two or more data entries in a data table;

displaying the data table in a data table user interface display displayed on a display device associated with a computing system;

providing a scrolling capability whereby a user can scroll through the data table displayed in the data table user interface display;

displaying a scrolling symbol for activation of the scrolling capability, the scrolling symbol being displayed in the data table user interface display;

selecting at least one of the one or more data fields containing information of the two or more data entries as a data display field;

activating via user input the scrolling capability via the scrolling symbol;

determining, while the scrolling capability is activated and information is changing in the display field, how many characters of the information in the data display field will be used as display data based, at least in part, on the data display field selected and the rate of change of information in the selected data display field; and while the scrolling capability is activated, displaying in the data table user interface display, the display data associated with each data entry in the data table as each data entry in the data table is scrolled through and the scroll is positioned on the data entry.

7. The computing system implemented method for providing an intelligent visual data scrollbar position indicator of claim 6, wherein;

the data display field is selected based on historical data display field selections by the user for the type of data table.

* * * * *